UNITED STATES PATENT OFFICE.

ROBERT E. DIVINE, OF CINCINNATI, OHIO, ASSIGNOR TO THE TWITCHELL PROCESS COMPANY, OF CINCINNATI, OHIO, A CORPORATION OF OHIO.

MINERAL-OIL SULFONIC ACID AND PROCESS OF MAKING.

1,303,779.     Specification of Letters Patent.     Patented May 13, 1919.

No Drawing.     Application filed April 16, 1917. Serial No. 162,457.

*To all whom it may concern:*

Be it known that I, ROBERT E. DIVINE, a citizen of the United States, and residing at Cincinnati, in the county of Hamilton and State of Ohio, have invented a new and useful Improvement in Mineral-Oil Sulfonic Acid and Processes of Making, of which the following specification is a full disclosure.

My invention relates to a process for producing certain new and valuable products from mineral oil sulfonic sludge and to the resultant products. Sludges resulting from the sulfonation of mineral oils contain sulfonic acids having the valuable property of hydrolyzing fats and capable of being combined with other elements for the manufacture of detergent.

The object of my invention is to produce a new species of sulfonic acids from mineral oil sludge, and of this new species sulfonic acids characterized by forming water-soluble salts with calcium and magnesium, characterized by detergent properties.

These alkali earth metal salts and the process of making them constitute the subject-matter of my copending application, Serial No. 162,456, filed April 16, 1917.

It is also an object to obtain the sulfonic acid free from the coloring matter of the sludge.

The sodium salts of these sludge sulfonic acids also form very water soluble detergents and these products and the process constitute the subject-matter of my copending application Serial No. 206,308, filed December 8, 1917.

I have obtained superior results by treating a mineral oil distillate such as illuminating oil with $SO_3$ in gaseous form diluted with air, and separating the resultant sludge, which is a heavy, viscous, semi-liquid body smelling strongly of $SO_2$ gas.

This particular sludge is desirable for my purpose because it contains about forty per cent. (40%) of sulfonic acid, some free sulfuric acid, coloring matter, unknown bodies, and only about ten per cent. (10%) of free oil which has to be removed. The sulfonic acid content of this sludge when separated, is very soluble in water, in fact, more readily soluble in water than in ether, and further characterized by the unique property of forming water-soluble combinations with earth metals—such as calcium. In these respects, the sulfonic acids obtainable from my process differ from the mineral oil sulfonic acids, with which I have been heretofore familiar.

I therefore take a sludge produced from sulfonating mineral oil, containing very water-soluble sulfonic acids, and mix one hundred parts of sludge into one hundred and fifty to two hundred parts of water, and allow it to stand for eight or twelve hours. Much heat is generated, sulfur-dioxid fumes are evolved, and the free oil will rise to the surface and is decanted. The under layer is a clear, dark-colored liquid, in which a rose purple color is discernible. To this liquid I add sufficient lime to neutralize the solution and a portion of the lime combining with the free sulfuric acid, is precipitated and filtered off from the solution of the calcium sulfonate, resulting from the combination of the lime with the sulfonic acid.

This solution is a clear, red-wine colored liquid, to which I add sodium chlorid up to about twenty per cent. (20%) of the weight of the solution, and the mineral calcium sulfonate separates out of the saline solution, which retains the coloring matter and impurities and is recovered by filtration and freed from liquid matter by pressing or other suitable means. This body may be characterized as a water-soluble mineral oil calcium sulfonate, of light yellow color, plastic, sticky, of distinct aromatic odor, readily soluble in cold water, giving a neutral solution.

When the materials are used in substantially the proportions indicated, one hundred pounds of sludge yields approximately from fifty to sixty pounds of the calcium compound. The invention is not limited to the illustrating proportions stated, nor to the origin or method of producing the sludge, nor to the specific calcium combination. Calcium, barium, magnesium, aluminum, form water-soluble sulfonates, in like manner. An earth metal sulfonate of mineral oil, sulfonic acid, may be commercially used for saponifying purposes or for producing detergents, or it can be used as a base for the production of sulfonic acids. The calcium and magnesium sulfonates being water-soluble, detergents made from these sulfonic acids are perfectly adapted to usage in hard or salt water.

The calcium sulfonate $(RSO_2O)_2Ca$ so produced, is dissolved in water and treated with sulfuric acid sufficient to precipitate out the calcium. The sulfonic acid is liberated and recovered by filtering off the insoluble calcium sulfate $Ca(SO_4)$. The mineral oil sulfonic acids are, when fresh, of a pinkish color, more soluble in water than in ether, form water-soluble salts with calcium, magnesium and like elements, and are less active in saponifying property than sulfonic acids heretofore produced from mineral oils by processes heretofore known to me.

Preferably, I employ a selected member of the alkali earthy metal bases, functioning to neutralize the sulfonic acid solution, and having the property of forming sulfates relatively insoluble in water, and sulfonates soluble in water but capable of being salted out of the solution.

These sulfuric acids recovered from a water solution of a sludge formed by sulfonating a portion of the contents of a mineral oil distillate, are a distinct species from the oil-extracted sulfonic acids of the Petroff Patent No. 1,087,888, being freely soluble in equal volumes of water, less soluble in oil than in water, not readily salted out of aqueous solution, have a different color, and a somewhat different efficiency for splitting fats and oils into glycerin and fatty acids.

Having described my invention, I claim:—

1. The steps in the process of making sulfonic acids from sludge formed by sulfonating a portion of the contents of a mineral oil, comprising combining the sulfonic acids of the sludge with an alkali earth metal forming sulfonates soluble in water, treating the sulfonates with a mineral acid forming a precipitate insoluble in water and free sulfonic acids and separating the liquid sulfonic acids from the precipitate.

2. The steps in the process of making sulfonic acids comprising mixing the sludge formed by sulfonating a portion of the contents of a mineral oil with water and dissolving the sulfonic contents, separating the solution from the oil, separating the sulfuric from the sulfonic acids in solution, and separating the sulfonic acids from the solution.

3. The steps in the process of making sulfonic acids consisting in mixing mineral oil sulfonated sludge with water and separating the oil, treating the solution with a base which forms water insoluble sulfate with the free sulfuric acid, and water soluble sulfonates with the sulfonic acids, separating the sulfate from the sulfonate solution, salting the sulfonates out of the water solution, and treating the sulfonates with a mineral acid to precipitate out the base of the sulfonates and separating the liquid sulfonic acids from the precipitate.

4. The steps in the process of making sulfonic acids from a sludge, formed by sulfonating a portion of the contents of a mineral oil, which consist in forming water soluble sulfonates, separating the sulfonate solution from the sludge and decomposing and separating the sulfonic acids from the base of the sulfonates.

5. The herein described process of making sulfonic acids from dark colored sludges obtainable by sulfonating a portion of the contents of mineral oils, which consists in forming a solution of the sulfonic contents of the sludge, adding to the solution a neutralizing material which will form an insoluble sulfate with the sulfuric acid and water soluble sulfonates with the sulfonic acids, separating the sulfate from the sulfonate solution, adding to the solution a reagent which salts out the sulfonates, forming a water solution of the sulfonates, adding an acid which precipitates out the base of the sulfonates and separating the precipitate from the sulfonic acids.

6. The herein described process of making sulfonic acid from dark colored sludges obtained by sulfonating a portion of the contents of mineral oils, which consists in forming a solution of the sulfonic contents of the sludge, adding a neutralizing material which combines with the sulfonic acids in solution, adding a reagent which salts out from solution the sulfonates, leaving the sludge coloring matter in solution, separating the sulfonates from the colored solution, dissolving the sulfonates, and adding an acid which decomposes the sulfonates into separable bodies comprising free sulfonic acids and a salt of the neutralizing material, and separating the sulfonic acids from said salt.

7. The sulfonic acids formed from mineral oil sludge consisting of a saponifying body, more soluble in water than in ether, forming water soluble salts with calcium and characterized by its detergent properties when combined with either an alkali or an alkali earth metal.

8. The steps in the process of making sulfonic acids which consists in sulfonating a portion of the contents of an oil of petrolic origin, mixing the resultant sludge with water to dissolve the sulfonic contents, separating the oil from the solution, adding to the solution a reagent forming water soluble sulfonates, salting the sulfonates out of the solution, dissolving the sulfonates and adding to the solution a material which precipitates the base, and finally separating the free sulfonic acids.

9. The sulfonic acids recovered from a water solution of the soluble portions of a sludge formed by sulfonating a portion of the contents of an oil of petrolic origin, characterized by being readily soluble in an equal volume of water, not readily salted out of a concentrated solution, less soluble in oil than in water, more soluble in water than in ether, and having the property of splitting fats and fatty oils into glycerin and fatty acids.

In witness whereof, I hereunto subscribe my name, as attested by the two subscribing witnesses.

ROBERT E. DIVINE.

Witnesses:
 M. SMITH,
 L. BECK.